United States Patent [19]

Odorzynski et al.

[11] Patent Number: 4,552,801

[45] Date of Patent: Nov. 12, 1985

[54] PLASTICIZED EVOH AND PROCESS AND PRODUCTS UTILIZING SAME

[75] Inventors: Thomas W. Odorzynski, Green Bay; Jack E. Knott, II, Appleton, both of Wis.

[73] Assignee: American Can Company, Greenwich, Conn.

[21] Appl. No.: 622,662

[22] Filed: Jun. 20, 1984

Related U.S. Application Data

[62] Division of Ser. No. 369,420, Apr. 19, 1982, Pat. No. 4,451,599, which is a division of Ser. No. 249,975, Apr. 1, 1981, abandoned.

[51] Int. Cl.$^4$ .................. B32B 9/04; B32B 27/08
[52] U.S. Cl. .................. 428/220; 428/343;
428/346; 428/349; 428/354; 428/355;
428/475.8; 428/476.1; 428/476.3; 428/515;
428/520; 428/522; 428/474.7; 428/474.9
[58] Field of Search ............... 428/343, 220, 346, 349,
428/354, 355, 475.8, 476.1, 476.3, 515, 520, 522;
427/474.7, 474.9

[56] References Cited

U.S. PATENT DOCUMENTS

| | | | |
|---|---|---|---|
| 3,560,325 | 2/1971 | Sogi et al. | 428/516 |
| 3,882,259 | 5/1975 | Nohara et al. | 428/35 |
| 4,064,296 | 12/1977 | Bornstein et al. | 428/35 |
| 4,082,854 | 4/1978 | Yamada et al. | 428/518 |
| 4,239,826 | 12/1980 | Knott, II et al. | 428/516 |
| 4,240,993 | 12/1980 | Sun | 264/22 |
| 4,243,074 | 1/1981 | Strutzel et al. | 428/36 |
| 4,243,724 | 1/1981 | Strutzel et al. | 428/474.7 |
| 4,254,169 | 3/1981 | Schroeder | 428/516 |
| 4,261,473 | 4/1981 | Yamada et al. | 428/35 |
| 4,261,482 | 4/1981 | Yamada et al. | 222/215 |
| 4,284,671 | 8/1981 | Cancio et al. | 428/35 |
| 4,289,830 | 9/1981 | Knott, II | 428/475.8 |
| 4,347,332 | 8/1982 | Odorzynski et al. | 524/169 |
| 4,427,825 | 1/1984 | Degrassi et al. | 525/58 |

FOREIGN PATENT DOCUMENTS

| | | |
|---|---|---|
| 53-49050 | 5/1978 | Japan . |
| 54-78749 | 6/1979 | Japan . |
| 54-78750 | 6/1979 | Japan . |
| 55-93449 | 7/1980 | Japan . |
| 56-27347 | 3/1981 | Japan . |

*Primary Examiner*—Joseph L. Schofer
*Assistant Examiner*—J. M. Reddick
*Attorney, Agent, or Firm*—Stuart S. Bowie; Ira S. Dorman

[57] ABSTRACT

An EVOH copolymer blend is extrudable to produce films of uniform caliper and excellent oxygen barrier properties. Aromatic sulfonamides are desirably utilized as plasticizers, and superior composite films including a layer of the plasticized EVOH are produced.

7 Claims, No Drawings

PLASTICIZED EVOH AND PROCESS AND PRODUCTS UTILIZING SAME

This is a divisional of co-pending application Ser. No. 369420 filed on Apr. 19, 1982, now U.S. Pat. No. 4,451,599, which was in turn a divisional of Ser. No. 249,975, filed on April 1, 1981, now abandoned.

BACKGROUND OF THE INVENTION

Ethylene vinyl alcohol (EVOH) copolymers are now recognized to have considerable value in packaging films, especially those that are intended for use for foods and other products that require protection against oxygen. The EVOH films do, however, suffer from a number of drawbacks. In particular, films made of EVOH tend to lack toughness and to be brittle particularly in the thin sections in which they are most economically used. Moreover, they do not provide an effective barrier against water or water vapor; in fact, the oxygen barrier properties of EVOH films decrease dramatically under conditions of relatively high humidity.

To accommodate such deficiencies and still take advantage of their attributes, the EVOH resins are normally used in multilayer films, wherein the EVOH layer is laminated to one or more structural layers, such as may be provided by nylon, polyethelene, polypropylene, and the like, and to various heat sealing layers, exemplary of which are the ionomer resins, ethylene vinyl acetate copolymers, etc.

However, because of the relatively poor flow characteristics exhibited by the EVOH copolymers in the softened and fused states, other difficulties are encountered when they are utilized in such multilayer films. Thus, it is found to be most difficult to achieve a uniform caliper across the entire width of the web, and this is particularly true when the EVOH is in contact with the other resins within the extruder die for a relatively long period of time. Also, inherent characteristics of the EVOH layer will preclude the use of such films for certain applications, and especially when the film is to be subsequently formed, as by vacuum thermoforming, which tends to cause small voids or so-called "pinholes" to develop therein.

Accordingly, it is a primary object of the present invention to provide a novel EVOH blend which can be extruded to produce composite films of uniform caliper, which films may exhibit a reduced tendency to form pin-holes, splits and the like when subjected to thermoforming operations or abuse.

It is also an object of the invention to provide such compositions which, when formed into films, exhibit excellent oxygen barrier properties, high levels of clarity and freedom from haze, and structural properties that are improved in one or more respects.

Another object of the invention is to provide such compositions which are capable of being extruded at reduced temperatures and/or with reduced power requirements, thereby enhancing the economy of conversion.

Additional objects of the invention are to provide novel processes by which such compositions may be coextruded with other thermoplastic resinous materials, and to provide novel products thereof.

SUMMARY OF THE INVENTION

It has now been found that certain of the foregoing and related objects of the invention are readily attained in a blend composition comprised of about 95 to 80 weight percent of EVOH copolymer, and conversely about 5 to 20 weight percent of a plasticizing agent. The EVOH copolymer will have a molecular weight of about 15,000 to 30,000, and a melting point temperature of about 325 degrees to 375 degrees Fahrenheit. The plasticizing agent with which the EVOH copolymer is intimately blended will be one or more compounds selected from the group consisting of aromatic sulfonamides, polyethyl oxazoline, polyvinyl pyrrolidone, polyvinyl formaldehyde, and polyamides having a melting point temperature below about 400 degrees Fahrenheit. Regardless of the specific composition of the plasticizer, it of course must be compatible with the EVOH copolymer and capable of intermolecular hydrogen bonding therewith, and must not degrade at the processing temperatures thereof.

In preferred embodiments, the blend will contain at least about 90 weight percent of the EVOH copolymer. The most desirable plasticizers will, in many instances, be the aromatic sulfonamides, especially preferred amongst which are the o,p-toluene and the ethylbenzene derivatives.

Other objects of the invention are provided in a process for producing a composite film produce including, as an initial step, the production of an EVOH copolymer blend having the composition hereinbefore described. The blend is heated to effect its fusion, and is thereafter continuously forced into an extrusion die. Simultaneously forced into the die is a filmforming resin which is of a composition different from the EVOH blend, and which is adherent thereto in the fused state. The EVOH blend and the resin are combined into a laminar structure comprised of first and second layers, respectively, which structure is forced through a die portion wherein it is substantially widened and thinned. The resultant sheet is extruded from the die as a composite film, wherein the caliper of each of its layers is substantially uniform across the width of the web. To complete the process, the film is cooled to produce the desired product.

In preferred embodiments of the process, the plasticizing material employed will be one of those hereinbefore identified for use in the preferred blends. The film forming resin that is coextruded with the EVOH copolymer will generally be selected from the group consisting of high molecular weight polyamides, anhydride modified polyolefin adhesives, and partially hydrolyzed ethylene vinyl acetate copolymer adhesives, and the polyamides utilized will generally have a molecular weight in the range of about 20,000 to 30,000, and a melting point temperature of about 415 degrees to 440 degrees Fahrenheit.

The process will most advantageously be carried out utilizing a stationary die, from which the extrudate will be cast upon a chill roll; typically, during passage through the die portion the composite structure will be increased in width by a factor of at least about 40. The process is capable of producing a composite film wherein the thickness of the EVOH blend layer will not exceed, at any point across the width of the web, about 40 percent of the mean thickness value, and wherein at least about 60 percent of the copoylmer layer will have a thickness that lies within about 20 percent of its intended (i.e., the mean) value.

In especially desirable embodiments of the process, a second film forming resin is introduced into the die, and combined with the EVOH composition and the first-mentioned resin into the laminar structure, to comprise a third layer thereof. The third layer may be disposed in full surface contact with the second layer of the laminar structure, in which event the first mentioned film forming resin (comprising the second layer) will serve to bond the first and third layers. In such a process, the adhesive resins hereinabove identified will advantageously be utilized as the first-mentioned resin, and the second mentioned resin may be one selected from the group consisting of polyethylene, polypropylene, ionomer and ethylene vinyl acetate copolymer (substantially unhydrolyzed). Alternatively, the first-mentioned and second-mentioned resins may both comprise film-forming polyamides having molecular weights in excess of about 20,000. In such a case, the second and third layers (comprised of the polyamide resin) will both be in full surface contact on opposite sides of the first layer (of EVOH copolymer blend).

In accordance with further embodiments of the process, at least one additional film forming resin may be introduced into the die, and combined with the EVOH composition and the first and second-mentioned resins into the laminar structure, to comprise at least a fourth layer thereof. A fifth layer may be provided adjacent the fourth layer, with the fifth layer being comprised of a heat sealing resin (such as ionomer) and the fourth layer comprising an adhesive serving to bond the ionomer to an adjacent layer (such as may be of polyamide resin). Typically, a composite film of the foregoing nature will have an overall thickness of about three to five mils.

In further embodiments, the process may include the additional steps of reheating the film to a temperature suitable for thermoforming, and thereafter subjecting the heated film to mehanical or fluid pressure, to stretch at least a portion of it. The product obtained upon cooling of the stretched film, to set it in its distorted condition, will be substantially free from pin-holes, cracks, and the like.

Yet additional objects of the invention are attained by the provision of novel products produced in accordance with the above-described processes.

DETAILED DESCRIPTION OF THE PREFERRED EMBODIMENTS

EVOH copolymers that are suitable for use herein will generally contain at least about 55, and as much as 80, weight percent of vinyl alcohol in the molecule; the preferred copolymers will contain about 60 to 75 weight percent of the vinyl alcohol moiety. The remainder of the molecule will consist essentially of ethylene; however, because such products are produced by hydrolysis of ethylene vinyl acetate copolymers, some residual vinyl acetate will usually be present. Normally, there will be less than about 3 weight percent of vinyl acetate in the EVOH molecule, and preferably it will be present at a level below 1.5 percent.

The EVOH copolymers will typically have molecular weights in the range of about 20,000 to 30,000, corresponding roughly to melt indices ranging from about 9 to 1.5. The melt index values for these resins are determined in accordance with ASTM test D-1238, Procedure E or L, using a weight of 2160 grams and a temperature of either 190 degrees or 230 degrees Centigrade, as appropriate. Typically, the copolymers will have densities of about 1.1 to 1.2, and their melting points will normally range from about 325 degrees to 375 degrees Fahrenheit; suitable temperatures for processing them will be about 400 degrees to 480 degrees Fahrenheit, in the unplasticized state. While the degradation temperature of EVOH is generally regarded to be about 450 degrees Fahrenheit, it should be appreciated that this is not inconsistent, due to the residence time factor and its effect upon degradation. Specific EVOH resins that are suitable for use are available from Kuraray and from Nippon Gohsei, both of Japan, the products of the former company being designated EP-E and EP-F, and those of the latter company being designated GL-D and GL-E, respectively.

The plasticizer utilized to produce the novel blends of the present invention must, of course, be one that is compatible with the EVOH copolymer employed, so as to avoid excessive blooming. Furthermore, it must be one that will not degrade at the temperatures to which the composition must be heated during processing and conversion, and it must be capable of intermolecular hydrogen bonding with the copolymer, so as to reduce its effective crystallinity and thereby improve flow characteristics.

Among the preferred plasticizers for use in the instant blends are the aromatic sulfonamide products, typified by those commercially available from the Monsanto Chemical Company under the brand designation SANTICIZER. Specific products in that category include No. 8 (i.e., a mixture comprising N-ethyl-o,p-toluenesulfonamide), No. 8 special (i.e., methylbenzene sulfonamide), No. 9 (i.e., a mixture comprising o,p-toluenesulfonamide), and No. 1-H (i.e., N-cyclohexyl-p-toluenesulfonamide); of the foregoing, the product that is found to be most desirable for many purposes is SANTICIZER 9. As indicated, other materials may also be advantageously utilized as plasticizers in the present blends, including polyethyl oxazoline, polyvinyl pyrrolidone and polyvinyl formaldehyde; polyamides exhibiting melting point temperatures below about 400 degrees Fahrenheit, such as nylon 6,36, nylon 11 and nylon 12 having molecular weights below about 25,000, and generally of about 5,000 to 10,000, may also be employed, but usually with less benefit than the other materials specified.

The amount of plasticizer incorporated will generally not exceed 20 weight percent of the total blend (i.e., the combined weights of the plasticizer and the EVOH copolymer), and frequently little if any added benefit will be found to result from the incorporation of more than about 10 percent thereof. On the other hand, while plasticizer concentrations as low as 1 or 2 weight percent may be employed, satisfactory results will generally require that at least 5 percent be used; accordingly, the preferred range of plasticizer concentration is about 5 to 10 weight percent, again based upon the total weight of the blend.

It is to be noted that, in accordance with the present invention relatively large amounts of plasticizer can be incorporated without significant detriment to the oxygen barrier properties of the EVOH copolymer. More particularly, unadulterated copolymers of the sort that are utilized in the practice of the present invention will generaly transmit oxygen at a rate less than one cubic centimeter-mil, per square meter of surface area, during a period of twenty-four hours under conditions of zero relative humidity and 73 degrees Fahrenheit. Incorporating as much as 20 weight percent of the plasticizers described into the copolymer is unexpectedly found not to increase the oxygen transmission rate above that value. Perhaps it should be mentioned that oxygen transmission at the indicated rate is regarded to characterize an excellent oxygen barrier film, and generally the apparatus utilized for the determination (e.g., a MoCon oxygen analyzer) wil not therefore be designed to measure lower values.

As indicated previously, the EVOH copolymers are normally utilized in multilayer films including other components intended to impart toughness, structural integrity, water vapor barrier properties, tensile strength, and other characteristics. Typical of such companion layers are the film-forming polyamides, polyethylenes (low, medium and high density), polypropylene, modified polyolefins, polyolefin copolymers such as of ethylene vinyl acetate and of ethylene acrylic acid, ionomers (e.g., duPont SURLYN products), and the like. Because of the poor adhesion of EVOH compositions to most resins other than the polyamides, it will generally be the practice to incorporate a layer of an adhesive material between the EVOH copolymer and the other component. As taught in U.S. Pat. Nos. 4,233,367, to Ticknor and Rein, 4,239,826, to Knott and Wang, and 4,254,169 to Schroeder (all of which are of common assignment herewith) a number of suitable extrudable adhesives are available on the market, typical of which are the products sold by Chemplex Company under the PLEXAR designation, and described in U.S. Pat. Nos. 4,087,587 and 4,087,588, and the resins sold by U.S. Industrial Chemicals Company, Division of National Distillers and Chemical Corp. under the designations S-2037 and S-2038, which are described in U.S. Pat. No. 4,239,826. In all instances, it is believed that such adhesives may be categorized as either an anhydride modified polyolefin or a partially hydrolyzed ethylene vinyl acetate copolymer. Other suitable adhesives are available from Norchem Company under the designation No. 2910, and from DuPont as CXA 3101 (both being ethylene organic acid ester copolymer compositions). It should be appreciated that, to minimize expense, the adhesive layer may itself be a composite, comprised of a core of a compatible, adherent resin, such as conventional ethylene vinyl acetate copolymer, interposed between relatively thin outer layers of the adhesive, per se.

As indicated above, a significant difficulty is often encountered in the coextrusion of EVOH copolymers with other polymers, apparently because of the rheology of the EVOH resin, which causes nonuniform thicknesses to occur across the width of the coextrudate; this is, of course, highly undesirable. The effect is especially pronounced when the composite films are produced by cast coextrusion, because the die is stationary (as opposed to the rotary dies often used in blown extrusion to promote uniformity), and because its configuration causes the resins to have a relatively long residence time in contact with one another; i.e., the combining die head may widen the laminate structure by factors of 40 to 80 fold, or more. This is not, of course, to say that products of the present invention may not be produced by means other than casting, such as by blown film and extrusion coating techniques.

Indicative, however, of such a problem of caliper variation are the difficulties that are encountered in cast coextruding a composite film including (among other components, which will hereinafter be identified in connection with Example 4) layers of nylon 6 on the opposite sides of a core of unmodified EVOH copolymer. Despite control to obtain a layer of the copolymer 0.4 mil thick (between layers of nylon 0.2 and 1.0 mil thick), measurements taken at points across the width of the coextruded web show that thicknesses in excess of 0.7 mil are produced, (with corresponding variations in the two nylon layers). Moreover, it is also found that as much as 70 percent of the EVOH layer deviates by more than 20 percent from the mean value desired. This can be contrasted with the results obtained utilizing, in lieu of the unplasticized EVOH resin, the same copolymer blended with 10 weight percent of a plasticizer, in accordance with the invention. Coextrusion under comparable conditions produces no region of EVOH that is thicker than 0.6 mil, and more than 60 percent of the film (again as determined by measurements taken at multiple points across its width) lies within 20 percent of the mean value of 0.4 mil.

Yet another benefit attributable to the the inclusion of a plasticizer concerns the results that are achieved in thermoforming of films containing a layer of modified EVOH copolymer. In such procedures, the film is heated to a temperature below its melting point but above that at which it can be permanently deformed (i.e., its glass transition temperature), and it is subjected to either mechanical or fluid pressure, so as to modify its shape. A serious problem is encountered in such operations, particularly when the film is subjected to deep drawing, in that small voids or "pin-holes" tend to develop, thus destroying the integrity of the package and rendering it unacceptable for most applications (and certainly when oxygen barrier properties are paramount). As will be seen in connection with Example 4, such problems may be obviated, or at least minimized, in the composite films of the invention.

Exemplary of the efficacy of the present invention are the following specific Examples:

EXAMPLE ONE

In a compounding extruder, nine parts of Kuraray EP-F resin are blended with one part of SANTICIZER 9, and are extruded and chopped to produce pellets of the blended composition. These pellets are then introduced into a small extruder having a 1" screw and a 14" die lip width, and the resin is extruded and cast upon a cold chill roll; the temperature of the melt at the point of exit from the die is about 400 degrees Fahrenheit, and the film thickness is approximately 2.0 mils.

For the sake of comparison, the same extruder is operated under the same temperature conditions to extrude pellets of the same EVOH copolymer from which the plasticizing agent is omitted. Substantial increases in back-pressure and power requirements are noted, indicating that a considerble reduction could be made in the temperature conditions used for extrusion of the plasticized copolymer.

Specimens of films of both the modified and also the unmodified copolymer are tested for oxygen transmission, utilizing a MoCon oxygen analyzer. It is found that both films are excellent oxygen barriers, each permitting transmission at a rate of less than one cubic centimeter-mil per meter square of surface area, during a period of 24 hours and under conditions of zero percent relative humidity and 73 degrees Fahrenheit. The tear strength, percent elongation and impact strength of both films are also tested, and found to be substantially improved by the incorporation of the plasticizer.

EXAMPLE TWO

The foregoing tests are repeated utiizing films in which the SANTICIZER 9 is replaced by the same amount of each of the following plasticizers: polyvinyl pyrrolidone, polyvinyl formaldehyde and polyethyl oxazoline. Again in comparison with the film produced using the unmodified EVOH copolymer, in all instances comparable oxygen barrier properties are exhibited. In addition, the polyvinyl pyrrolidone improves elongation, tear strength and impact; the polyvinyl formaldehyde and the polyethyl oxazoline improve impact primarily, with the latter compound also increasing tensile strength and elongation somewhat.

EXAMPLE THREE

The same tests are again performed, but in this instance substituting each of several different EVOH copolymers, both as unmodified and also as modified by SANTICIZER 9, to produce films; the copolymers employed are those identified above and designated EP-E, GL-D and GL-E. Extrusion temperatures are adjusted to correlate to the melting point of each resin. Upon testing, comparable oxygen barrier properties are found to exist, regardless of whether the film is plasticized or not; the plasticized EVOH copolymers are again extruded with less back-pressure, and various physical property improvements are exhibited, as noted above.

EXAMPLE FOUR

The SANTICIZER 9 modified copolymer of Example One is introduced into an appropriate coextrusion die, together with feed-streams of 25,000 molecular weight nylon 6, SURLYN, and of an adhesive of the sort described above, and effective to bond the SURLYN to the nylon. The composite film product contains succesive layers of nylon, modified EVOH copolymer, nylon, adhesive and SURLYN, in respective thicknesses of about 1.0 mil, 0.4 mil, 0.2 mil, 1.2 mils and 1.2 mils. The EVOH copolymer is introduced into the combining adaptor of the extruder at a temperature of about 430 degrees Fahrenheit, and the nylon is introduced thereinto at a temperature of approximately 530 degrees Fahrenheit; the die itself is maintained at a temperature of approximately 500 degrees Fahrenheit, and the overall width of the extruded composite film is approximately 80" (having had a substantially square cross-sectional configuration, of about one square inch in area, at the inlet side of the die head). A similar film is produced in the manner described, which differs only in that the EVOH copolymer utilized is not modified by incorporating the plasticizing agent.

Upon cooling, the two films are tested for oxygen transmission, and each is found to have a value of less than one cubic centimeter, in the units and under the conditions described previously. Caliper measurements across the width of the two films produce the data hereinabove set forth with reference to this Example, thus substantiating the significant improvement in caliper control indicated (i.e., no region of EVOH thicker than 0.6 mil, and more than 60 percent thereof lying within 20 percent of the mean value of 0.4 mil).

Finally, as also alluded to above, the two films are subjected to thermoforming operations utilizing a Mahaffey-Harder machine No. 717 to package sausage, under appropriate conditions, which are identical in both instances. As a result, three pin-holes are produced during a run of the unplasticized composite film, whereas no pin-holes are developed during a comparable run using the film containing the plasticized EVOH copolymer. Moreover, in a 1,000-mile transportation simulation test, involving 36 packages produced with each of the films, four severe pin-holes develop in the web including the unplasticized EVOH copolymer; in contrast, only one minute pin-hole is found to have developed in the film produced with the SANTICIZER-containing EVOH resin.

Thus, it can be seen that the present invention provides a novel EVOH blend which can be coextruded with other resins to produce composite films of uniform caliber, which films are relatively tough and exhibit a reduced tendency to form pin-holes, splits and the like when subjected to thermoforming operations or abuse. Films made in accordance with the invention exhibit excellent oxygen barrier properties, and high levels of clarity and freedom from haze; certain structural properties, or "physicals", are also normally improved. The modified resins are capable of being extruded at reduced temperatures and/or with reduced power requirements, thereby maximizing the economy of conversion. The invention moreover provides novel processes and products thereof.

Having thus described the invention, what is claimed is:

1. As a composite film of relatively uniform caliper, a coextrudate comprised of successive first through fifth layers of: (1) film-forming polyamide resin, (2) a blend of about 95 to 80 weight percent of at least one ethylene vinyl alcohol copolymer, and conversely about 5 to 20 weight percent of a plasticizer therefor, (3) film-forming polyamide resin, (4) adhesive and (5) ionomer resin, respectively, said film-forming polyamide resin having a molecular weight of about 20,000 to 30,000 and a melting point temperature of about 415 degrees to 440 degrees Fahrenheit, said EVOH copolymer having a molecular weight of about 15,000 to 30,000, a vinyl alcohol moiety content of about 60 to 75 percent thereof, and a melting point temperature of about 325 degrees to 375 degrees Fahrenheit, said adhesive layer comprising an anhydride modified polyolefin or a partially hydrolyzed ethylene vinyl acetate copolymer, and said plasticizer being an aromatic sulfonamide selected from the class consisting of o,p-toluene sulfonamide, N-ethyl-o,p-toluenesulfonamide and ethylbenzene sulfonamide.

2. The film of claim 1 wherein said film is about three to five mils thick.

3. The film of claim 2 wherein said adhesive layer is itself a composite comprised of a core having exterior layers of said adhesive.

4. The film of claim 1 wherein the thickness of said EVOH layer (2), at any point across the width of said film, deviates by no more than about 40 percent from the mean thickness value of said layer, and wherein at least about 60 percent of said layer has a thickness within about 20 percent of said mean value.

5. As a composite film, a coextrudate comprised of successive layers of (1) film-forming polyamide resin, (2) a blend of about 90 weight percent of at least one ethylene vinyl alcohol copolymer and about 10 weight percent of a plasticizer therefor, and said plasticizer being an aromatic sulfonamide selected from the class consisting of o, p-toluene sulfonamide, N-ethyl-o, p-toluene sulfonamide and ethylbenzene sulfonamide and (3) film-forming polyamide resin, respectively, said film-forming polyamide resin having a molecular weight of about 20,000 to 30,000 and a melting point temperature of about 415 degrees to 440 degrees Fahrenheit, said EVOH copolymer having a molecular weight of about 15,000 to 30,000, a vinyl alcohol moiety content of about 60 to 75 percent thereof, and a melting point temperature of about 325 degrees to 375 degrees Fahrenheit, the thickness of said EVOH layer (2), at any point across the width of said film, deviating by no more than 50 percent from the mean thickness value of said layer, and at least about 60 percent of said layer having a thickness within about 20 percent of said mean value.

6. The film of claim 5 wherein said mean value is 0.4 mil.

7. The film of claim 5 wherein said film additionally includes, as successive layers on said layer (3), (4) adhesive and (5) ionomer resin.

* * * * *